Oct. 6, 1964     O. C. WILSON ETAL     3,151,498
FOOT PEDAL
Filed April 18, 1962
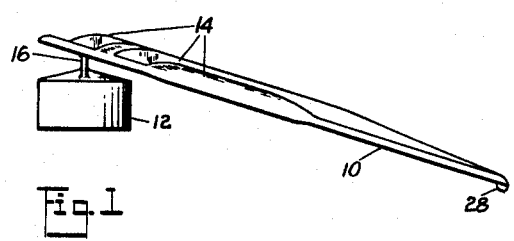
Fig. 1
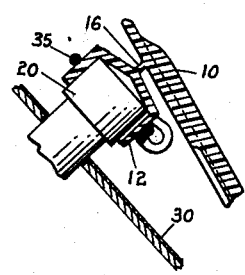
Fig. 6
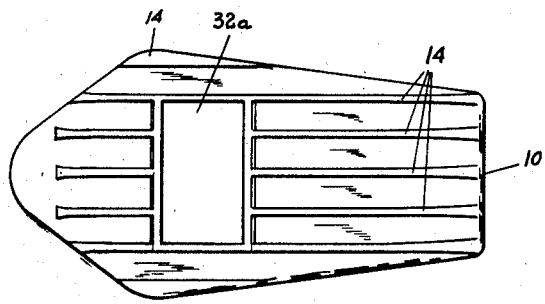
Fig. 2
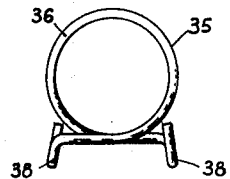
Fig. 7
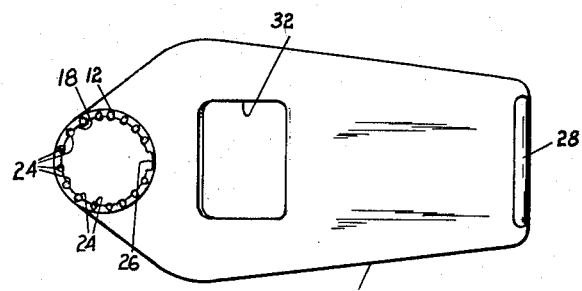
Fig. 3
Fig. 4
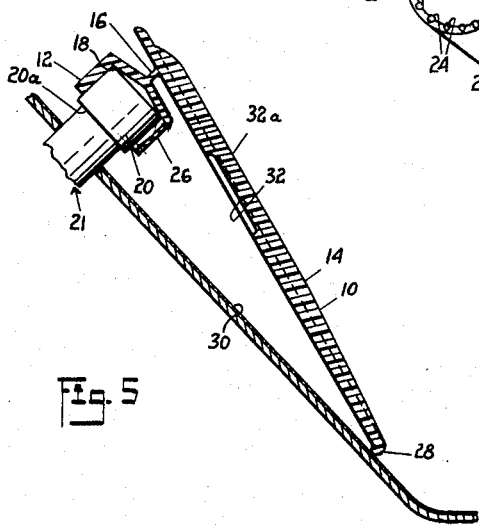
Fig. 5
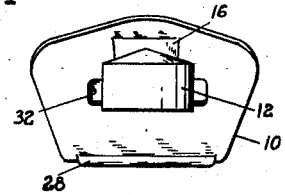
INVENTORS
ORAN C. WILSON AND
RICHARD L. MOTTER
BY Teare, Tetzer + Teare
ATTORNEYS

United States Patent Office 3,151,498
Patented Oct. 6, 1964

3,151,498
FOOT PEDAL
Oran C. Wilson, Norwalk, and Richard L. Motter, Milan, Ohio, assignors to Wilson Plastics, Inc., Sandusky, Ohio, a corporation of Ohio
Filed Apr. 18, 1962, Ser. No. 188,419
7 Claims. (Cl. 74—560)

This invention relates in general to foot pedals and more particularly to an extension foot pedal for use in connection with the dimmer switch of an automotive type vehicle, for facilitating the operation of such switch.

In an automotive vehicle, the dimmer switch for dimming and brightening the lights of the vehicle is generally located on the left hand side of the floor of the vehicle under the dash panel, and locating of such switch by the left foot of the vehicle operator is somewhat inconvenient, and especially under an emergency situation when the operator must speedily or unexpectedly search for the switch to dim or brighten the vehicle lights.

The present invention provides an extension foot pedal of novel construction for ready application to such dimmer switch, thereby greatly facilitating the locating of the switch by the operator's foot, and enabling quick and expeditious operation of the switch.

An object of the present invention is to provide a novel extension pedal for a foot operated switch, such as the dimmer switch of an automotive type vehicle.

Another object of the invention is to provide a novel extension pedal for a foot operated switch, such as the dimmer switch of an automotive type vehicle, which may be readily attached to the dimmer switch, and which comprises an elongated body portion adapted for engagement by the foot of the operator, and a head portion depending from said body portion and adapted for holding coaction with the dimmer switch, and wherein the head portion is movably or flexibly attached to said body portion.

A still further object of the invention is to provide a foot pedal of the above type which is relatively uncomplicated in construction, which is economical to produce, and which can be easily attached to the floor dimmer switch of an automotive vehicle.

Other objects and advantages of the invention will be apparent from the following description taken in conjunction with the accompanying drawings wherein:

FIG. 1 is a side elevational view of a foot pedal constructed in accordance with the invention;

FIG. 2 is a top plan view of the foot pedal of FIG. 1;

FIG. 3 is a bottom plan view of the foot pedal of FIG. 1;

FIG. 4 is an end elevational view taken from the left hand end of FIG. 1;

FIG. 5 is a sectional view of the foot pedal as applied to a conventional dimmer switch, and illustrating its preferred position with respect to the floor board of an automotive vehicle;

FIG. 6 is a fragmentary, sectional view generally similar to FIG. 5, but showing a modification wherein a spring-type clamp is associated with the head portion of the pedal, for aiding in maintaining the pedal in assembled relation with the dimmer switch; and FIG. 7 is a top plan view of the clamp shown in FIG. 6.

Referring now again to the drawings, the extension foot pedal may be formed of plastic material and may comprise an elongated body portion 10, having a head portion 12 attached thereto adjacent one end thereof. The body portion 10 extends downwardly and rearwardly in angular relation with respect to the head portion, as shown in FIG. 1. The upper surface of the body portion may be provided with lengthwise extending ridges or corrugations 14 thereon, which will provide an anti-slippage surface for the body portion, as well as strengthening the latter.

Now in accordance with the instant invention, the head portion 12 is attached to the underside of the body portion by a relatively flexible web 16, such web providing for relative movement between the head portion and the body portion. The head portion has a recess or chamber 18 therein opening onto the underside of the head portion, and with such chamber being of cylindrical configuration for fitting over the conventional generally cylindrically shaped, axially movable cap 20 of the dimmer switch 21. As best shown in FIG. 5, the lower boundary of the pedal head portion 12 preferably terminates at or slightly above the lower boundary 20a of the switch cap, so as to not interfere with the downward axial movement of the cap 12 during actuation of the switch.

As best shown in FIG. 3, the defining surface of chamber 18 is preferably provided with vertically extending ribs 24 which are adapted to grip the dimmer switch cap 20, and with such ribs preferably extending the full depth of the chamber 18. The defining wall of the chamber 18 is provided with a section 26 of reduced thickness as compared to the thickness of the remainder of the wall, which reduced thickness section increases the elasticity of the wall of the head portion and enables it to be expanded somewhat as it is forced over the dimmer switch cap and which will cause effective gripping of the dimmer switch cap, and thus hold the pedal in desired mounted condition on the cap. The rearwardmost end of the body portion is preferably provided with a lug 28 depending therefrom, and extending transversely across substantially the full width of the rearward end of the body portion, for providing a fulcrum or pivot for the pedal when it is in mounted position on the dimmer switch cap and in engaged condition at its rearward end with the floor of the vehicle.

The extension foot pedal as aforementioned is preferably formed of a plastic, such as a thermoplastic or thermo-setting plastic material, having sufficient rigidity so that upon application of pressure by the operator's foot to the body portion, the head portion will force the dimmer switch cap downwardly to actuate the switch, and with such plastic material having sufficient impact resistance so that it will not break or crack under a sudden impact of the operator's foot. However, such plastic material is not completely rigid and enables the aforementioned web portion 16 to flex, and thereby provide for relative movement in a generally vertical plane between the head portion and the body portion of the pedal. Many suitable plastic materials, well known in the plastic art, are available to provide such characteristics, such as for instance the polystyrene plastics or the polyvinyl plastics, and the poly blends thereof.

As can be best seen from FIG. 5 of the drawings, the elongated body portion 10 with its depending lug 28 at its rearward end, is adapted for engagement with the confronting diagonal portion of the floor surface 30 of the vehicle, and with such lug 28 serving as a pivot or fulcrum for downward movement of the pedal to cause axially inward movement of the cap 20 of the dimmer switch, and thus actuate the switch. Upon such inward movement of the cap, since the cap moves along the linear axis of the dimmer switch, the head portion 12 of the pedal may move or pivot in a generally vertical plane coplanar with the longitudinal vertical center plane of the body portion and relative to the body portion 10 due to the flexibility of the web 16, and thus there is no danger of the head portion fracturing from the body portion.

The body portion 10 may be provided with an indentation 32 in its underside, which conveniently provides for a raised planar section 32a on the upper or foot engaging surface of the pedal.

The foot pedal may be so disposed in the vehicle so as to extend somewhat transversely of the vehicle floor rather than more or less lengthwise of the vehicle floor as shown in FIG. 5, thereby providing a pedal extension for a dimmer switch which may be readily oriented to the inclinations or desires of the vehicle operator. The foot pedal can be provided in a plurality of colors thereby increasing the attractiveness of the foot pedal and adding to the decor of the interior of the vehicle.

Referring now to FIGS. 6 and 7, there is shown a spring type clamp 35 which may be utilized in conjunction with the head portion 12 of the pedal, to aid in maintaining the head portion in gripping coaction with the dimmer switch cap 20. Such clamp may be readily formed from spring type wire with the circular portion 36 of the clamp adapted to encircle the head portion 12 and with the clamp being formed with ear portions 38 adapted to be moved toward one another against the resistance to deformation of the clamp, and as by means of a pair of pliers, to enlarge the circular portion 36 and permit ready slipping of the clamp onto the head portion 12.

From the foregoing description and accompanying drawings it will be seen that the invention provides a novel extension foot pedal for use especially on the dimmer switch of an automotive type vehicle, and which is uncomplicated in construction, and economical to manufacture, and which may be readily applied to the switch, and one comprising an elongated body portion and a head portion adapted for mounting coaction with the conventional cap of the dimmer switch, and there being means for providing for relative movement between the head portion and the body portion.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

We claim:

1. An extension foot pedal for a floor mounted dimmer switch and the like comprising a body portion, a head portion, flexible web means attaching said head portion to said body portion, said flexible web means lying in a plane which intersects the plane of the body portion along a line which is transverse to the longitudinal axis of the body portion, and means on said head portion for attaching the same to a dimmer switch.

2. A pedal in accordance with claim 1 wherein said body portion is of elongated configuration, said head portion and associated web means depending from said body portion adjacent one end of said body portion, said means on said head portion comprising a recess in said head portion adapted to receive therein in frictional clamping coaction the cap of the dimmer switch.

3. A pedal in accordance with claim 1 wherein said head portion is formed of a yieldable material and comprises a chamber therein opening to the underside thereof for receiving the cap of the dimmer switch, the defining wall of said chamber having a section of reduced thickness to provide for increased elasticity to such defining wall.

4. An extension foot pedal for a floor mounted dimmer switch and the like comprising a body portion, a head portion disposed adjacent one end of the body portion, flexible web means attaching said head portion to said body portion, means on said head portion for attaching the same to the dimmer switch, said means comprising a recess in said head portion adapted for receiving therein the cap of the switch, and elongated rib means on the defining interior surface of said recess adapted for gripping coaction with the dimmer switch cap.

5. A pedal in accordance with claim 4 wherein the other end of said body portion embodies a transversely extending lug depending from said body portion.

6. In combination, a foot actuated dimmer switch including a reciprocal cap, mounted on a diagonally extending portion of the floor of an automotive vehicle, and a plastic extension foot pedal mounted on said dimmer switch cap, said foot pedal comprising an elongated body portion and a head portion, said body portion extending diagonally downwardly and rearwardly from said head portion and engaging said diagonally extending floor portion at the free end of said body portion, said head portion having a recess in the underside thereof receiving therein the cap of the dimmer switch, the defining wall of said recess having a section of reduced thickness as compared to the thickness of the remainder of the wall to provide for increased elasticity to the wall, generally vertically extending ribs disposed on the interior of said wall and in said recess, and gripping said cap for frictionally holding said pedal on said cap, and a flexible web movably connecting said head portion to said body portion to provide for pivotal movement of said head portion relative to said body portion in a generally vertical plane coplanar with the longitudinal vertical center plane of said body portion, during actuation of said switch.

7. The combination in accordance with claim 6 including a detachable spring-type clamp encircling the exterior of said head portion and aiding in maintaining said head portion in gripping coaction with said cap.

References Cited in the file of this patent

UNITED STATES PATENTS

| 499,632 | Heivly | June 13, 1893 |
| 543,903 | Seibert | Aug. 6, 1895 |
| 2,584,883 | Karsch | Feb. 5, 1952 |
| 2,719,898 | Allen | Oct. 4, 1955 |
| 2,851,902 | Dishong | Sept. 16, 1958 |
| 2,879,008 | Boychick | Mar. 24, 1959 |
| 2,969,691 | Cherry | Jan. 31, 1961 |

FOREIGN PATENTS

| 16,721 | Germany | Jan. 3, 1882 |
| 450,611 | Great Britain | July 22, 1936 |
| 221,094 | Switzerland | Aug. 1, 1942 |